US008006136B2

(12) United States Patent
Kube et al.

(10) Patent No.: US 8,006,136 B2
(45) Date of Patent: Aug. 23, 2011

(54) AUTOMATIC GRAMMAR BASED FAULT DETECTION AND ISOLATION

(75) Inventors: Nathan John Walter Kube, Vancouver (CA); Daniel Malcolm Hoffman, Victoria (CA)

(73) Assignee: Wurldtech Security Technologies, Vancouver (CA)

( * ) Notice: Subject to any disclaimer, the term of this patent is extended or adjusted under 35 U.S.C. 154(b) by 324 days.

(21) Appl. No.: 12/247,157

(22) Filed: Oct. 7, 2008

(65) Prior Publication Data

US 2009/0204848 A1    Aug. 13, 2009

Related U.S. Application Data

(60) Provisional application No. 60/978,364, filed on Oct. 8, 2007, provisional application No. 61/077,458, filed on Jul. 1, 2008.

(51) Int. Cl.
    *G06F 11/00*    (2006.01)
(52) U.S. Cl. ........................................... 714/33; 714/25
(58) Field of Classification Search .................... 714/25, 714/33, 38, 30
    See application file for complete search history.

(56) References Cited

U.S. PATENT DOCUMENTS

| | | | |
|---|---|---|---|
| 5,724,273 A * | 3/1998 | Desgrousilliers et al. .... | 702/120 |
| 5,913,023 A | 6/1999 | Szermer | |
| 6,125,457 A * | 9/2000 | Crisan et al. ..................... | 714/36 |
| 7,480,900 B1 * | 1/2009 | Zhou et al. ..................... | 717/132 |
| 2001/0054174 A1 * | 12/2001 | Boggs et al. ........................ | 717/4 |
| 2003/0051163 A1 * | 3/2003 | Bidaud .......................... | 713/201 |
| 2006/0090100 A1 * | 4/2006 | Holzapfel et al. .............. | 714/38 |
| 2006/0184928 A1 * | 8/2006 | Hughes ........................... | 717/168 |
| 2007/0220342 A1 * | 9/2007 | Vieira et al. ..................... | 714/33 |
| 2008/0115112 A1 | 5/2008 | Sharma | |
| 2008/0184206 A1 * | 7/2008 | Vikutan ......................... | 717/127 |

FOREIGN PATENT DOCUMENTS

WO    2006106502 A2    10/2006

OTHER PUBLICATIONS

Model-Based Testing of a Highly Programmable System, Software Reliability Engineering, 1998 Proceedings of the Ninth Symposium on Nov. 4-7, 1998, pp. 174-179.
Using Attributed Event Grammar Environment Models for Automated Test Generation and Software Risk Assessment of System-of-Systems, Systems, Man and Cybernetics, 2005 IEEE International Conference, vol. 2, pp. 1870-1875.
Bird, D.L., and C.U. Munoz, Automatic Generation of Random Self-Checking Test Cases, IBM Systems Journal 22 (3),1983, pp. 229-245.
Hanford, K.V., Automatic Generation of Test Cases, IBM Systems Journal 9(4):242-257, 1970.

(Continued)

*Primary Examiner* — Scott Baderman
*Assistant Examiner* — Sarai Butler
(74) *Attorney, Agent, or Firm* — Knobbe Martens Olson & Bear LLP

(57) ABSTRACT

The present disclosure relates to automated testing of hardware and software systems. In some embodiments, a testing framework that generates a set of test cases for a system under test using a grammar is disclosed. The grammar may include terminal and nonterminal symbols with tags that describe a test sequence. The testing framework can use the grammar to generate a set of test cases. The testing framework can then receive feedback about the execution of the set of test cases from the system under test. In response to the feedback, the testing framework can generate a new set of grammars by automatically modifying or inserting tags in the original grammar. The new set of grammars can then be used to generate further test cases that intelligently explore the system under test for correctness, conformance, performance, security, or reliability.

33 Claims, 7 Drawing Sheets

OTHER PUBLICATIONS

Lammel, R., and W. Schulte, Controllable Combinatorial Coverage in Grammar-Based Testing, Proceedings of the 18th IFIP TC6/WG6.1 International Conference, TestCom 2006, New York, New York, May 16-18, 2006.

Sirer, E.G., and B.N. Bershad, Using Production Grammars in Software Testing, Second Conference on Domain Specific Languages, Austin, Texas, Oct. 3-5, 1999, pp. 1-13.

* cited by examiner

```
<Book>
    Goldilocks
    <Chapter> </Chapter>
</Book>
```

```
<Book>
    Goldilocks
    <Chapter>
        <Section> </Section>
        <Section> </Section>
        <Section>
            Once upon a time
        </Section>
    <Chapter>
</Book>
```

```
<Book>
    Goldilocks
    <Chapter> </Chapter>
</Book>
```

S ::=
    BadFlags1 SYN
    BadFlags2 SYNACK
    BadFlags3 ACK1
    BadFlags4 FINACK1
    BadFlags5 FINACK2
    BadFlags6 ACK2
    BadFlags7;

SYN ::= '[SYN]' 'out' 'accept';
SYNACK ::= '[SYN,ACK]' 'accept' 'in';
ACK1 ::= '[ACK]' 'out' 'accept';
FINACK1 ::= '[FIN,ACK]' 'accept' 'in';
FINACK2 ::= '[FIN,ACK]' 'accept' 'out';
ACK2 ::= '[ACK]' 'in';

*510*
*500*

{depth 4}
BadFlags1 ::= BadFlag1 BadFlags1;
BadFlags1 ::= BadFlag1;
BadFlag1 ::= '[' Flag1 ']' 'in' 'drop';
Flag1 ::= List('flag1.1', 'flag1.2');

{depth 4}
BadFlags2 ::= BadFlag2 BadFlags2;
BadFlags2 ::= BadFlag2;
BadFlag2 ::= '[' Flag2 ']' 'in' 'drop';
Flag2 ::= List('flag2.1', 'flag2.2');

{depth 4}
BadFlags7 ::= BadFlag7 BadFlags7;
BadFlags7 ::= BadFlag7;
BadFlag7 ::= '[' Flag7 ']' 'in' 'drop';
Flag7 ::= List('flag7.1', 'flag7.2');

AUTOMATIC GRAMMAR BASED FAULT DETECTION AND ISOLATION

CROSS-REFERENCE TO RELATED APPLICATIONS

This application claims the benefit of U.S. Provisional Patent Application No. 60/978,364, entitled SYSTEM AND METHODS FOR AUTOMATED GRAMMAR BASED FAULT DISCOVERY AND ISOLATION, filed Oct. 8, 2007, and U.S. Provisional Patent Application No. 61/077,458, entitled AUTOMATIC GRAMMAR BASED FAULT DETECTION AND ISOLATION, filed Jul. 1, 2008, there entireties of which are incorporated herein by reference.

BACKGROUND

1. Field of the Invention

This disclosure generally relates to testing of systems. More specifically, this disclosure relates to automatically generating test cases that reveal faults of a system.

2. Description of the Related Technology

Generally described, computing devices can be utilized in a variety of contexts such as for exchanging information, facilitating communication between users, facilitating the operation and control of a wide variety devices and processes, and the like. In the context of a manufacturing or production environment, a computing network made up of a number of computing devices, including personal computing devices, server computing devices, programmable logic controllers (PLCs), and/or other networked devices can be utilized in conjunction with a communication network, such as a wide area network (WAN), to facilitate the operation and control of various devices/processes. For example, a networked PLC may be utilized to control the operation of physical manufacturing or processing equipment, such as controllers for valves, power supplies, pumps, machinery, etc. Similarly, a software application, or suite of software applications, may be hosted on a networked computing device (such as a server or personal computing device) to receive instructions regarding the operation of various equipment and transmit the appropriate respective instructions to the appropriate equipment (such as through a PLC).

In the event of fault in one or more networked computing devices, such a fault in a computing device can lead to the failure of associated equipment, loss of manufacturing/production time, property damage, and the like. Accordingly, computing devices (including hardware and software aspects) can be designed with redundant components to avoid fault conditions during execution in a manufacturing/production environment. Additionally, computing systems can be tested to verify that requirements for safety and redundancy are met and to discover errors in design/implementation. For example, a testing system can be implemented, such as in a laboratory, that attempts to emulate various commands, instructions, or other environmental information and then measure the response generated by the computing device(s) being tested. The emulated commands, instructions, or other environment information can be embodied as a test case or testing procedure that can be executed by a testing system.

One approach to the generation of test cases and/or testing procedures for computing device testing involves the utilization of testing grammars from which test cases/testing procedures can be derived. Generally described, grammar based test generation involves a grammar that describes a set of strings. The grammar can be processed by a testing system and utilized to derive test cases corresponding to the set of strings in the grammar. However, traditional approaches to testing grammars generally described too large of a set of strings. Accordingly, the resulting test cases from such testing grammar are often too large and require too much testing system resources to effectively test devices.

SUMMARY

The present disclosure generally relates to the automated testing of a system that includes software or hardware components (referred to herein as the "system under test" or "device under test"). In some embodiments, a testing framework generates a set of test cases for a system under test using a grammar. Each test case may perform an action, such as provide an input to the system, and result in an output from the system under test. The output can then be compared to the expected result to determine whether the system under test is performing correctly.

In an illustrative embodiment, the grammar may include terminal and nonterminal symbols with attributes that describe a test sequence for the set of test cases. The testing framework can use the grammar to generate a corresponding set of test cases based on the attributes of the grammar. Additionally, the testing framework can then receive feedback that includes results of the processing of inputs generated by the testing framework from the set of test cases and sent to the system under test. In response to the feedback, the testing framework may automatically modify the set of test cases as a function of the feedback. For example, the testing framework can modify attributes of the grammar or create new grammars to broaden or narrow the set of test cases generated by the testing framework.

BRIEF DESCRIPTION OF THE DRAWINGS

The present disclosure will now be described in detail below in connection with the following figures in which:

FIG. 5A illustrates an exemplary grammar with a tag that is automatically generated and controls creation of test cases for a transmission control protocol, according to an embodiment of the disclosure.

DESCRIPTION OF THE EMBODIMENTS

The present disclosure relates to testing of a system that may comprise hardware or software. The system can be tested using a framework that automatically generates test cases using context free grammars. The grammars describe a set of test cases that can be utilized by the testing framework to generate a set of inputs to a system under test, or a device under test, to verify that such system under test or device under meets requirements or to detect errors in the system under test or device under test.

In contrast to testing frameworks in which grammars are edited manually, the testing framework modify an existing grammar or create a new grammar by controlling grammar attribute tags. The modification of the attribute tags results in the selection/creation of a subset of test cases generated by the previous version of the grammar or previous grammar. In an embodiment, a method is provided that generates a new set of grammars by automatically modifying or inserting tags in an original grammar. The automatic modification and/or insertion is based on feedback obtained from the system under test or device under test from inputs corresponding to the previous set of test cases.

In accordance with an illustrative embodiment, the testing framework can be used to assess specific vulnerabilities and security threats to control system devices and networks. The present disclosure may be particularly beneficial for systems, such as process control and supervisory control and data acquisition (SCADA) systems, that have traditionally used closed proprietary architectures. However, one skilled in the relevant art will appreciate that the disclosed testing framework, operating environment, test cases, and grammars are illustrative in nature and should not be construed as limiting. Additionally, the present disclosure should not be construed to be applicable to any particular system under test or device under and that all disclosed embodiments are also illustrative in nature.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
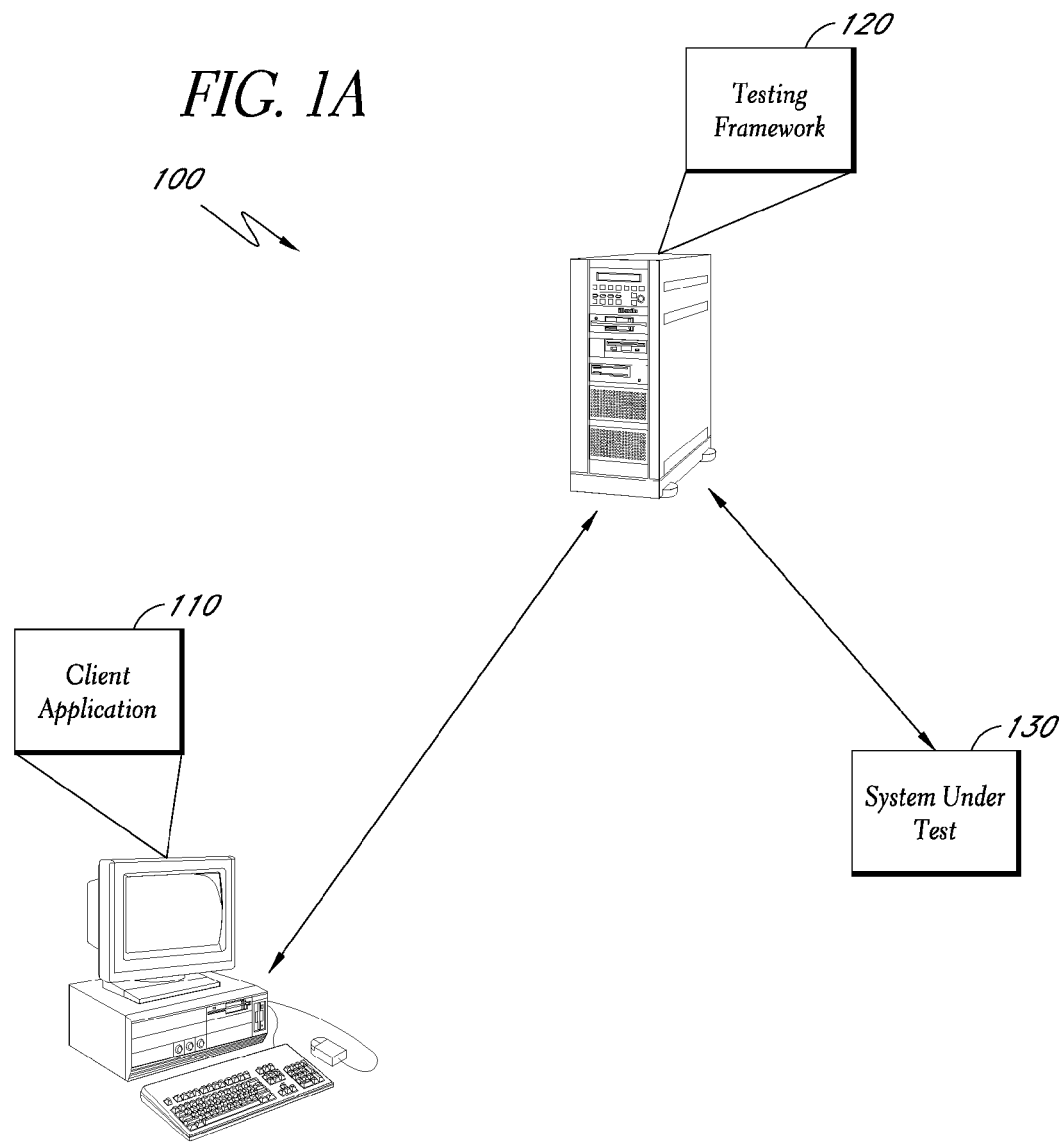
FIG. 1A illustrates a block diagram of an exemplary system capable of automatically generating grammar tags, according to an embodiment of the disclosure.

FIG. 1A illustrates a block diagram of an exemplary system 100 capable of automatically modifying existing grammar tags or generating grammar tags for fault discovery and isolation of a system under test 130. As shown, a client application 110 communicates with a testing framework 120. Testing framework 120 may communicate with system under test 130. Communication within the system may take place over a network using sockets, ports, and other mechanisms recognized in the art. The communication may also be via wire(s), cable(s), flex circuit(s), wireless technologies, or other suitable analog or digital communication methodologies and devices to perform those methodologies. Client application 110, testing framework 120, and system under test 130 may reside on physically separate machines, such as computers, or be on the same machine. Still further, although client application 110 and testing framework 120 are illustrated in a client-server model, one skilled in the relevant art will appreciate that the system 100 may be implemented in a peer-to-peer network embodiment.

Client application 110 may be an application running on a computing device that allows a user to select configuration and test procedures to run on system under test 130. In an embodiment, where client application resides on a computer separate from testing framework 120, client application 110 may send data to testing framework 120 that specifies the user selected configuration and test procedures to run. After tests have been run on system under test 130, client application 110 can receive results from testing framework 120 and generate reports based on the results. In an alternative embodiment, the client application 110 may be hosted as a network-provided service.

Testing framework 120 may be an application running on a computer server that generates and executes tests on system under test 130 based on the configuration and test procedures selected by the user with client application 110. For example, testing framework 120 can include a web service component running on a computer server or distributed across one or more computers and operative to exchange information via an application programming interface ("API"). When test results are received from system under test 130, testing framework 120 may refine a testing strategy and create a second set of tests that are broader or narrower than the original tests run on system under test 130.

For example, in one embodiment testing framework 120 may test system under test 130 using a grammar that generates a set of test cases that causes the testing framework to provide all numbers from one to six digits, i.e., 0 to 999,999, as input to system under test 130. In one embodiment, feedback received from the system under test 130 may be used to narrow the set of test cases such that only the inputs that created a fault in the system under test remain in the set of test cases. With reference to the previous example, the testing framework can modify the grammar such that the set of test cases would cause the testing framework to provide as inputs to the system under test 130 all numbers from one to five digits, i.e., 0 to 99,999, as input. In another embodiment, feedback received from the system under test 130 may be used to expand the set of test cases to increase the inputs sent to the system under test to elicit a fault or error condition. With reference again to the previous example, the testing framework can modify the grammar such that the set of test cases would cause the testing framework to provide as inputs to the system under test 130 all numbers from one to seven digits, i.e., 0 to 9,999,999, as input.

As previously described, the testing framework 120 may generate a first set of test cases from a first set of grammars. The first grammar may be created by, for example, with aid of client application 110. Using first grammar, testing framework 120 can then generate a first set of test cases to run on system under test 130. An artisan will recognize that there a variety of ways to generate test cases from a grammar, including conventional parsing techniques. Based on the results of the first set of test cases, testing framework 120 can then automatically create a second grammar by modifying or inserting tags and tag values into the first grammar that widen or constrict the set of test cases. With testing framework 120, more focused testing of the system under test 130 can occur. This may be advantageous, given the high costs associated with hardware and software testing.

System under test 130 may comprise a computer program, hardware device, and/or a combination of one or more hardware device(s) and computer program(s). For example, the system under test 130 can include an operating system or software application. In another example, the system under test 130 may be a hardware device, such as a programmable logic controller or supervisory control and data acquisition system. As previously discussed, the system under test 130 may be a combination of hardware or software components such as a computing device executing one or more computer programs. In some embodiments, the system under test 130 may be a database, user interface, computer network, and embedded or industrial device. One skilled in the relevant art will appreciate that additional or alternative configurations of the system under test 130 will be considered to be within the scope of the present disclosure. Additionally, although the system under test 130 is referred to as a computer system, the system under test may correspond to a single computing device or computer program.

Figure 1B:
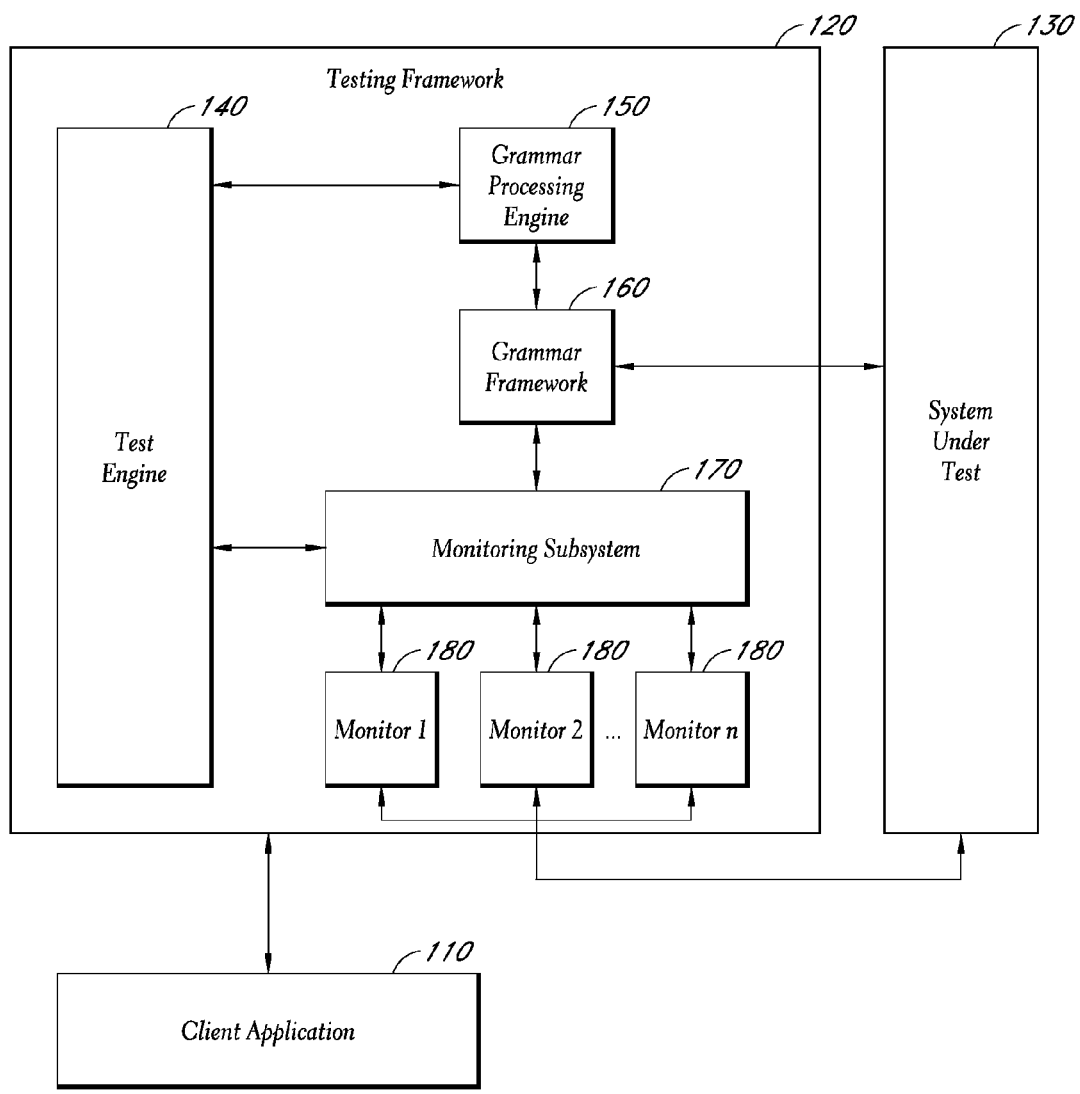
FIG. 1B illustrates exemplary components of the testing framework of FIG. 1A, according to an embodiment of the disclosure.

FIG. 1B illustrates exemplary components of testing framework 120, according to some embodiments of the disclosure. As depicted, testing framework 120 can include a test engine 140, a grammar processing engine 150, a grammar framework 160, and a monitoring subsystem 170. The test engine 140 may coordinate monitoring of the system under test 130, scheduling and managing of interdependencies between testing, launching of the tests, and recording of test results in, for example, a unified reporting structure.

Grammar processing engine 150 may receive results from tests run on system under test 130 from test engine 140. The results may include an actual output from system under test 130 that results from an input being applied to system under test 130. The actual output may be compared to an expected output to determine whether system under test 130 operates as expected. Grammar processing engine 150 can use the results to create a second (new) set of one or more grammars by modifying or inserting tags, attributes, or annotations into one or more grammars of the first (original) set of grammars according to different strategies. For example, grammar processing engine 150 may generate tag combinations that reveal faults. Further, grammar processing engine 150 can generate tags that reduce the total number of test cases generated by finding a smaller set of tags that reveal the already existing faults that have been exposed by the original set of grammars. Additionally, grammar processing engine 150 can perform a neighborhood search, by for example, generating grammars that create a new set of test cases near the original set of test cases.

The grammar framework 160 may typically include a grammar with attributes. The grammar with attributes may describe a set of one or more test cases. Of note, grammar framework 160 may parse the grammar and generate a set of test cases that can be run on the system under test 130. Further, grammar framework 160 can then execute the test cases on system under test 130. As shown, the results of the test cases can also be gathered by grammar framework 160 from system under test 130 to coordinate execution of the test cases.

As further illustrated, monitoring subsystem 170 receives results from executing the test cases on system under test 130. Monitoring subsystem 170 can then use one or monitors 180 to correlate results from the execution of test cases with, for example, the health or status of the system under test 130. This may be advantageous for understanding the effects of test cases on, for example, available memory, processing resources, network response time, and other specific process functionality of system under test 130. Further, monitoring subsystem 170 allows the results of tests to be interpreted in a reliable, repeatable, and affordable manner.

Monitor 180 may use a variety of techniques to observe the environment or health of system under test 130 during testing, for example. As shown, there may be one or more types of monitors. Additionally, there can be one or more instances of each type of monitor 180 in a test environment. Monitors 180 may also correspond to external software or hardware components for observing the system 100 or system under test 130.

In an exemplary embodiment, monitor 180 may receive output from system under test 130 in real time, for example. This may be particularly helpful where the system under test 130 is a device controller. In this situation, a device that is operated by system under test 130 may exhibit normal behavior in response to an erroneous input from system under test 130—often the result of the device entering a fail safe mode. As a result, it may be improperly assumed that system under test 130 is operating correctly as well. A monitor 180 that examines the output of system under test 130, such as step function, would expose this flawed assumption and can therefore be particularly advantageous for ascertaining whether the system under test 130 is actually functioning correctly. To determine whether the system under test 130 is performing as expected, for example, monitor 180 may compare the actual step function to an expected step function. A discrepancy between the step functions can indicate that a test case resulting from a grammar has exposed a fault of system under test 130.

Additionally, monitor 180 may be useful for determining network connectivity. For example, monitor 180 may determine whether system under test 130 is connected to a network or in communication with a device, such as a computer server running a component of testing framework 120. In this embodiment, monitor 180 may use internet control message protocol (ICMP) messages to determine whether the system under test 130 is connected to the network. Alternatively, monitor 180 can use an open connectivity interface to ascertain whether system under test 130 is communicating with other devices.

Figure 2:
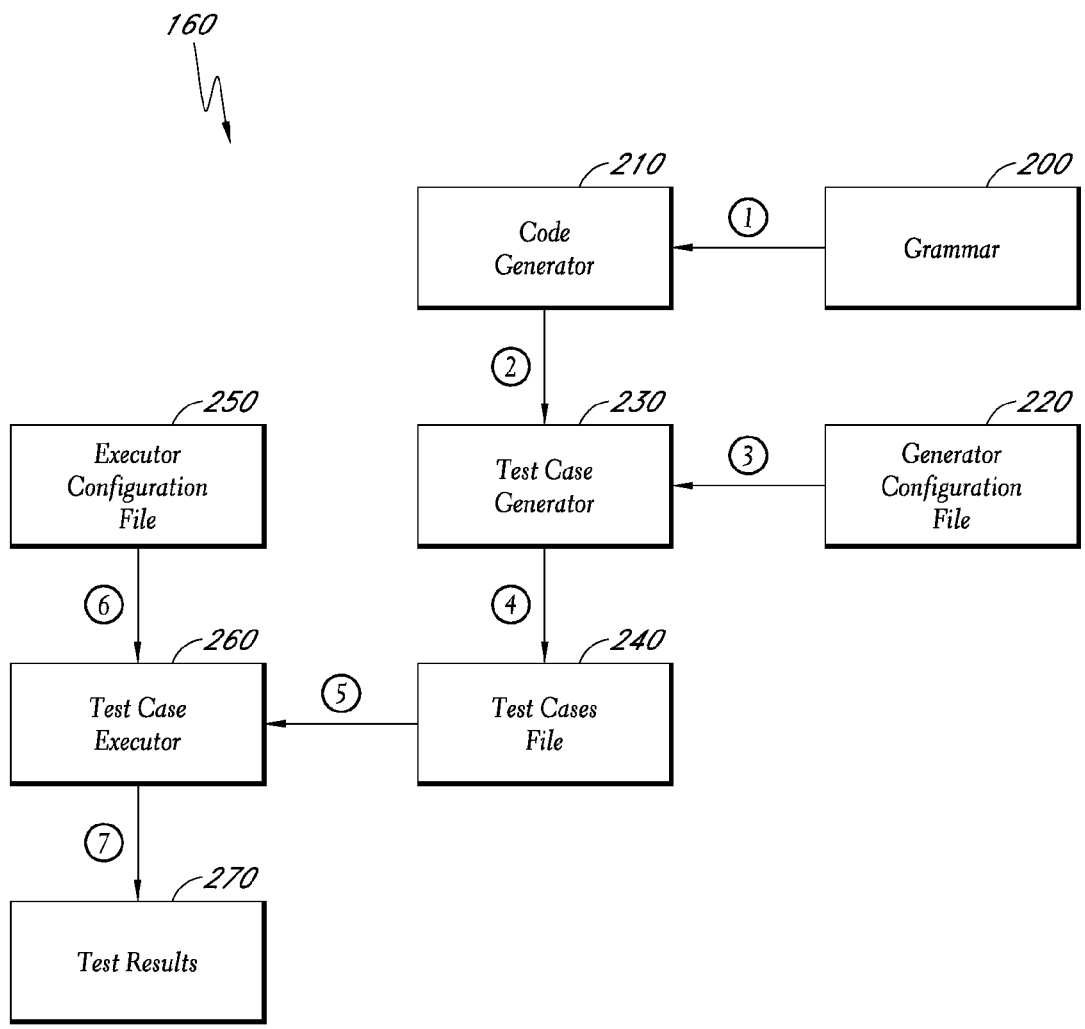
FIG. 2 illustrates a block diagram of exemplary components of the grammar framework of FIG. 1B, according to an embodiment of the disclosure.

FIG. 2 is a block diagram illustrating the interactions of the grammar framework 160, according to an embodiment of the disclosure. In the embodiment of FIG. 2, grammar framework 160 can include various components, such as a grammar 200, code generator 210, generator configuration file 220, and test case generator 230, which may be used to generate a test cases file 240. Grammar framework 160 may also include an executor configuration file 250 and test case executor 260, which can be used to execute test cases file 240 and obtain test results 270.

With continued reference to FIG. 2, an interaction of the components of the grammar framework 160 will be described with an illustrated embodiment. The grammar 200 and associated attributes or tags, along with corresponding tag values, can represent one or more test cases. The grammar 200 can then be passed as an input to code generator 210. Of note, although grammar 200 may initially be created manually by, for example, a software developer to describe an initial set of test cases, its subsequent modification may be completely automated by testing framework 120 using, for example, grammar processing engine 150.

The code generator 210 may parse grammar 200 and create test case generator 230. In an embodiment, test case generator 230 comprises an executable program. Test case generator 230 can be supplied with an initialization file, such as generator configuration file 220, which sets various configuration options and parameters for testing. For example, generator configuration file 220 may control the number and types of test cases that are generated by assigning values to grammar tags. Generation configuration file may be updated by grammar processing engine 150 to attempt different combinations of grammar tags in order to widen or constrict the test cases to, for example, find or pinpoint a cause of failure. When supplied with generator configuration file 220, test case generator 230 may then write out test cases that are described and/or can be derived by the grammar to the test cases file 240.

Test case executor 260 can read in the test cases file 240. Depending on the embodiment, test case executor 260 may also read in the executor configuration file 250, which may include information about system under test 130. This information can be used to set various options for testing system under test 130. An artisan will recognize that lexical analysis and/or parsing can both be used to process the information contained in test cases file 240 and executor configuration file 250. Test case executor 260 may then set any options specified by the executor configuration file 250 and execute the test cases in any order, report, and record the test results 270.

Figure 3:
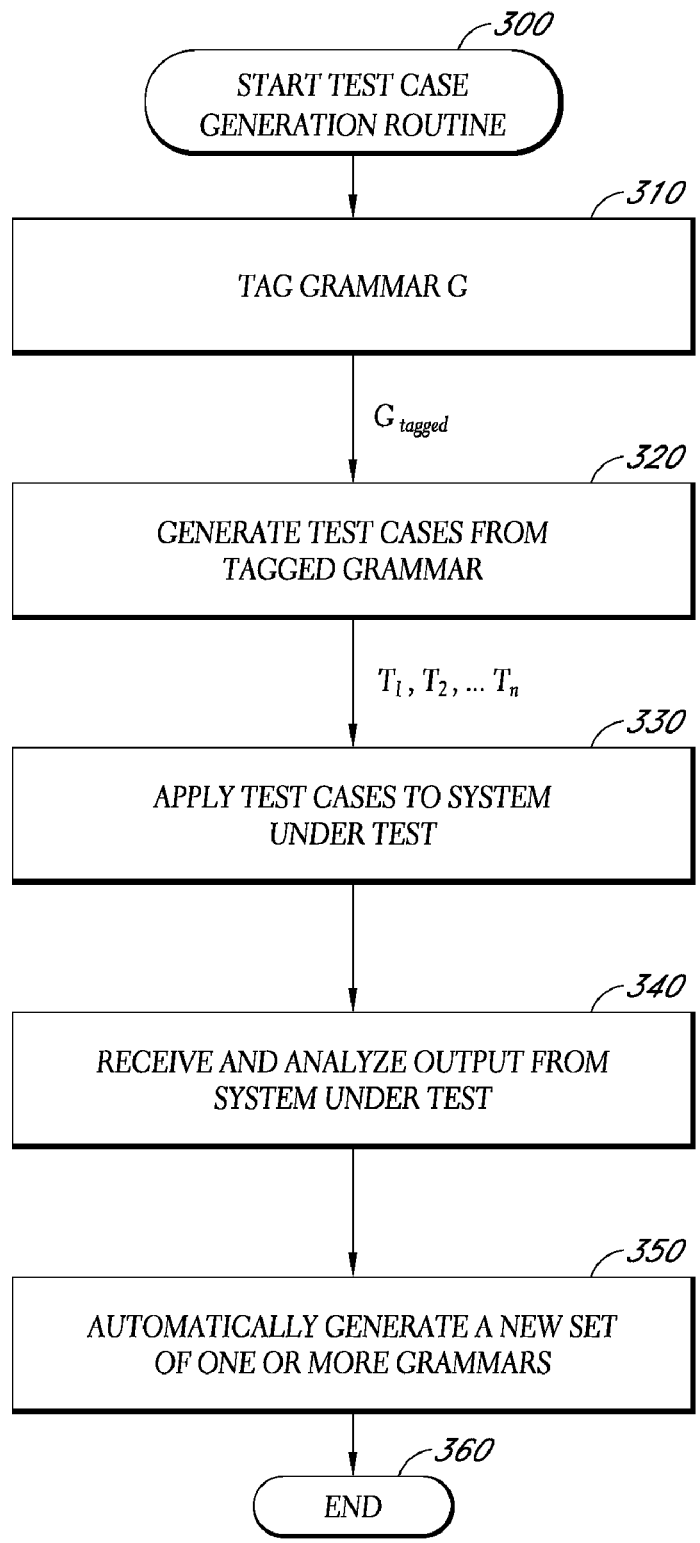
FIG. 3 illustrates a flow diagram illustration of a test case generation routine performed by the exemplary components of the systems of FIGS. 1A and 1B, according to an embodiment of the disclosure.

FIG. 3 illustrates a flow diagram of a test case generator routine 300 performed by the exemplary components of the systems of FIGS. 1A and 1B, according to an embodiment of the disclosure. For example, in some embodiments, this routine can be performed by components of testing framework 120, such as grammar processing engine 150. Depending on the embodiment, the method of FIG. 3 may include fewer or additional blocks and blocks may be performed in an order that may be different than illustrated.

Beginning in block 310, an original grammar, G, is tagged with a set of one or more tags or attributes. In an embodiment, the grammar may further include corresponding tag values. The grammar may describe one or more test cases that can be run on, for example, system under test 130. The original grammar may initially be developed by, for example, a tester using a manual process. Alternatively, original grammar may be a grammar that was automatically created by, for example, grammar processing engine 150 to generate a set of test cases.

At block 320, an original set of test cases, such as, $T_1$, $T_2$, and $T_n$ are created from the original grammar. The original set of test cases can be generated by the grammar framework 160 described herein. In an embodiment, a parser such as CUP Parser Generator for Java™ can be used to generate the set of test cases that are described by the original grammar. A test case may be an event, action, or input, such as executable code, values, etc., that are applied to system under test 130. Typically, each test case has an expected result.

At block 330, the original set of test cases are applied to a system under test 130. For example, a set of input values can be supplied as input to system under test 130. System under test 130 may comprise any number of hardware components or may include software, such as an operating system or an application. In some embodiments, the system under test 130 may include a real time operating system; support various networking protocols and services, such as FTP; or have sparse resources.

The set of test cases may present situations that test various software or hardware configurations to determine open ports and vulnerable services residing on a system under test 130. Further, the set of test cases may check for flaws known to exist in the system under test 130. In an embodiment, the set of test cases may request a vast amount of resources to determine how the system under test 130 responds. Additionally, the set of test cases may be used to analyze network security by, for example: gathering network addresses, checking available services and protocols used, checking credentials for system under test 130; and selectively targeting and determining other vulnerabilities of the system under test 130.

At block 340, output from the system under test 130 is received using, for example, a network. The output may be analyzed by monitoring subsystem 170. As described above, monitoring subsystem 170 can quantify the effect of test cases on the system under test 130 by, for example, comparing the actual output from system under test 130 with the expected output for each test case. In some embodiments, one or more monitors 180 can be utilized to observe the system under test 130 during testing.

Continuing to block 350, a new (second) set of grammars is created that isolate causes of failure of system under test 130. The new set of grammars can be created by grammar processing engine 150 using the techniques described above. For example, tags of the original grammar may be modified, based on test case results, so that the resulting test cases apply input values within a narrower range to system under test 130. Alternatively, more grammars can be created that result in test cases that apply a wider range of input values to system under test 130. Of note, grammar processing engine 150 may use feedback from monitoring subsystem 170 to modify generator configuration file 220.

In certain embodiments, the feedback may include pass or fail information after a test case has run. The feedback may be received by grammar processing engine 150 after a specified post test period has passed. This period of time may be the period needed for monitors 180 that were enabled to observe system under test 130 adequately and determine the effects of a test case. The feedback information may indicate a pass when the status of all or some monitors 180 remained normal during execution of the test case, which may indicate that the test case did not negatively impact the system under test 130. Alternatively, the feedback information may indicate a failure when the status of some monitors indicate a problem, such as a warning or alarm, during test case execution.

As noted, based on the feedback from test case execution, grammar processing engine 150 may modify generator configuration file 220. Generator configuration file 220 may then be used to create a second (new) set of test cases when grammar framework 160 is executed. Thus, the feedback information can be used to control and modify grammar tags to create a new set of grammars that search for faults of the system under test 130.

Figures 4A, 4B, 4C, 4D:
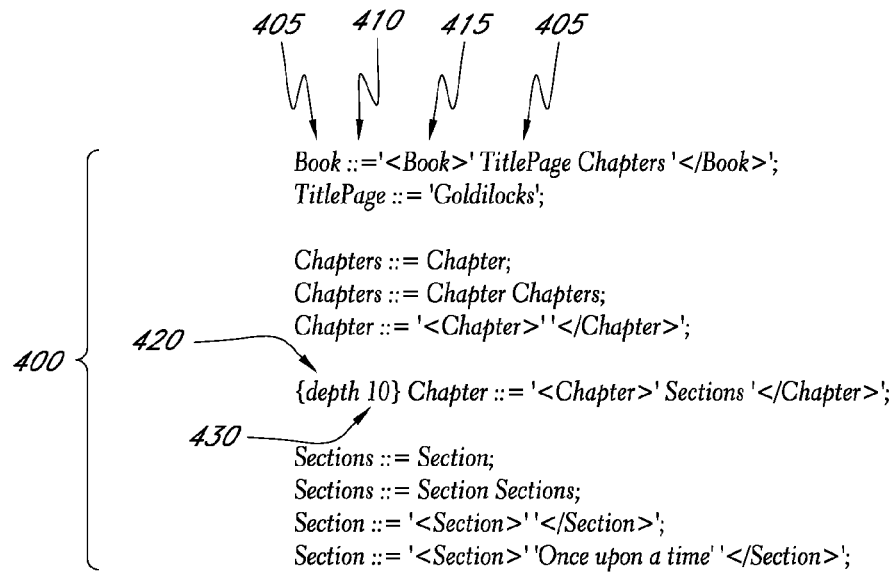
FIG. 4A illustrates an exemplary grammar with a depth tag that is automatically generated and controls creation of test cases for a word processing application, according to an embodiment of the disclosure.
FIGS. 4B-4D illustrate exemplary test cases for a word processing application that are derived from the grammar of FIG. 4A, according to some embodiments of the disclosure.

FIG. 4A illustrates an exemplary grammar with a tag that is automatically generated and controls creation of test cases for a word processing application, according to an embodiment of the disclosure. The grammar shown may be used to generate test cases for an illustrative word processing application that supports chapters and nested sections. For the purposes of this illustration, the illustrative word processing application has a fault that is revealed when the last chapter of a document does not include any sections as shown in FIG. 4B.

As depicted in FIG. 4A, the grammar may include one or more rules 400, such as Book. A rule specifies a symbol substitution that can be recursively performed to create new sequences of symbols. Each rule may include a nonterminal symbol 405, followed by a separator 410 such as the "::=" symbol, and one or more nonterminal symbols 405 and/or one or more terminal symbols 415. A terminal symbol can form parts of strings, such as test cases, generated by the grammar. A nonterminal symbol generates strings by substituting nonterminals or terminals for itself, or a combination of nonterminal or terminal symbols.

For example, the Book rule includes nonterminal symbols 405 TitlePage and Chapters, and terminal symbols 415 '<Book>' and '</Book>.' Typically, one of the nonterminal symbols 405 in the grammar is designated as a starting nonterminal symbol by, for example, placing it first. In the embodiment shown, the starting nonterminal symbol is Book.

As further shown, the grammar includes a depth tag 420 with a value 430 of "10." Depth tag 420 may be used to limit the number and type of test cases that can be derived from the grammar by limiting the depth of the language tree that represents the syntactic structure of strings, such as test cases, that can be derived. For example, depth tag 420 with value 430 of "10" in the illustrated grammar limits the total number of test cases to 750 and still exposes the fault of the word processing application when the last chapter of the book does not include any sections. In an embodiment, when depth tag 420 has a value 430 of "10", the height, which can correspond to the number of levels in the tree, is limited to 10. Without depth tag 420, the grammar would describe an infinite number of test cases that may be too long to run.

FIGS. 4C and 4D illustrate exemplary test cases for a word processing application that are derived from the grammar of FIG. 4A, according to some embodiments of the disclosure. In the test case shown in FIG. 4C, the fault of the word processing application is not revealed because the fault occurs when the last chapter of a document does not include any sections. Without limiting depth tag 420 to a value 430 that is manageable, the test cases generated by the grammar may be not only too numerous and long, but also not reveal faults. By restricting the generation of test cases to a subset of the full language of test cases described by the grammar, a substantial savings in tester productivity and effectiveness can be achieved while still exposing the same faults as the full set of test cases that are described by grammar.

As noted above, grammar processing engine 150 of testing framework 120 can generate tags that reduce the total number and length of test cases produced by finding a smaller set of tags that reveal already existing faults. FIG. 4D shows an example of such a test case. As can be seen, the test case can reveal the fault that occurs when the last chapter of a document does not include any sections. In this embodiment, grammar processing engine 150 has reduced depth tag 420 to a value 430 of "1." This can have numerous advantages. First, the number of derivations trees that correspond to the number of test cases derived from the grammar has been reduced. Second, the number of derivations has been limited. Thus, the number and size of the test cases has been substantially reduced from when depth tag 420 had a value 430 of 10. In an illustrative embodiment, the number of derivations corresponds to a derivation tree.

Of note, various tags can be used to automatically control the generation of test cases. In some embodiments, a tag that controls recursion by controlling the number of levels in a language tree corresponding to test cases can be generated by grammar processing engine 150. Further, a tag that controls balance by, for example, limiting the difference between path lengths in the language tree can be used. Additionally, a tag that uses rule weights can be employed to allow statistical control over the selection of rules with the same left hand side or nonterminal. In one embodiment, tags with covering arrays can be generated to allow combinatorial selection from the combinations generated by the right hand side of a rule, including terminal or nonterminal symbols. In some embodiments, general rule guards may be utilized to allow for activation and/or deactivation of rules based on a condition, such as a Boolean. Further, in an embodiment, embedded code that allows for the insertion of arbitrary software code that can be executed during test case generation or execution may be used.

All of the foregoing approaches may be utilized in the present disclosure to test a system that can include hardware or software. The tags and tag values disclosed can be selectively chosen by grammar processing engine 150 based on a testing strategy, such as a neighborhood search. For example, in some embodiments, the tags and tag values may be used to isolate one of a plurality of test cases that may have triggered a fault of the system. Further, the tags and tag values can be used to generate other test cases that are near test cases that reveal faults of the system. Thus, the automatic modification or insertion of grammar tags and tag values may greatly improve testing of the system.

FIG. 5A illustrates an exemplary grammar with a depth tag that is automatically generated and controls creation of test cases for a transmission control protocol, according to an embodiment of the disclosure. The grammar shown can generate test cases for control flags in transmission control protocol (TCP) packets. Of note, TCP uses 6 binary control flags in a header of a packet. Out of the 64 possible combinations of control flags, only 18 are legal or valid. For purposes of this illustration, TCP has faults that may be revealed when any of the 46 illegal flag combinations are present in the control header of a packet. The illustrated grammar can generate packets such as "SYN out accept." An artisan will recognize that such packets can be converted to TCP packets using conventional techniques in the art.

Although TCP packets with any illegal flag settings should be discarded, often the state of a TCP session influences whether packets with illegal flag combinations are forwarded in a network, for example. Because the state of a TCP session can greatly affect whether a fault is revealed, the grammar of FIG. 5A can generate a large set of test cases. This set of test cases may be too large to run if grammar tags are not used to control the generation of test cases. With a total of 7 places to insert the 46 illegal combinations of control flags, over 400 Billion test cases that correspond to TCP sessions may be generated by the grammar of FIG. 5A.

Advantageously, the grammar shown uses a depth tag 500 to control the number of test cases. In the illustrated embodiment, depth tag 500 has a value 510 of "4"; however, other types of tags and tag values are possible. Thus the tagged grammar of FIG. 5A, which can be automatically generated by grammar processing engine 150, can enable effective and repeatable testing within a large search space.

Notably, grammar processing engine 150 may use a search strategy that varies a single depth tag and flag list at a time. In one embodiment, a flag list in each generated grammar can include all 46 illegal flag values (bad flags) and vary a value 510 of depth tag 500 from "4" to "6." It is worth noting that these values 510 indicate 1, 2, or 3 bad flag packets. In this embodiment, there are 3 values for depth tag 500 and 7 total bad flag rules, which yields 21 grammars that can be created for each bad flag by grammar processing engine 150, for example. Because there are 7 bad flags, 147 total grammars may be generated by grammar processing engine 150.

Figure 5B:
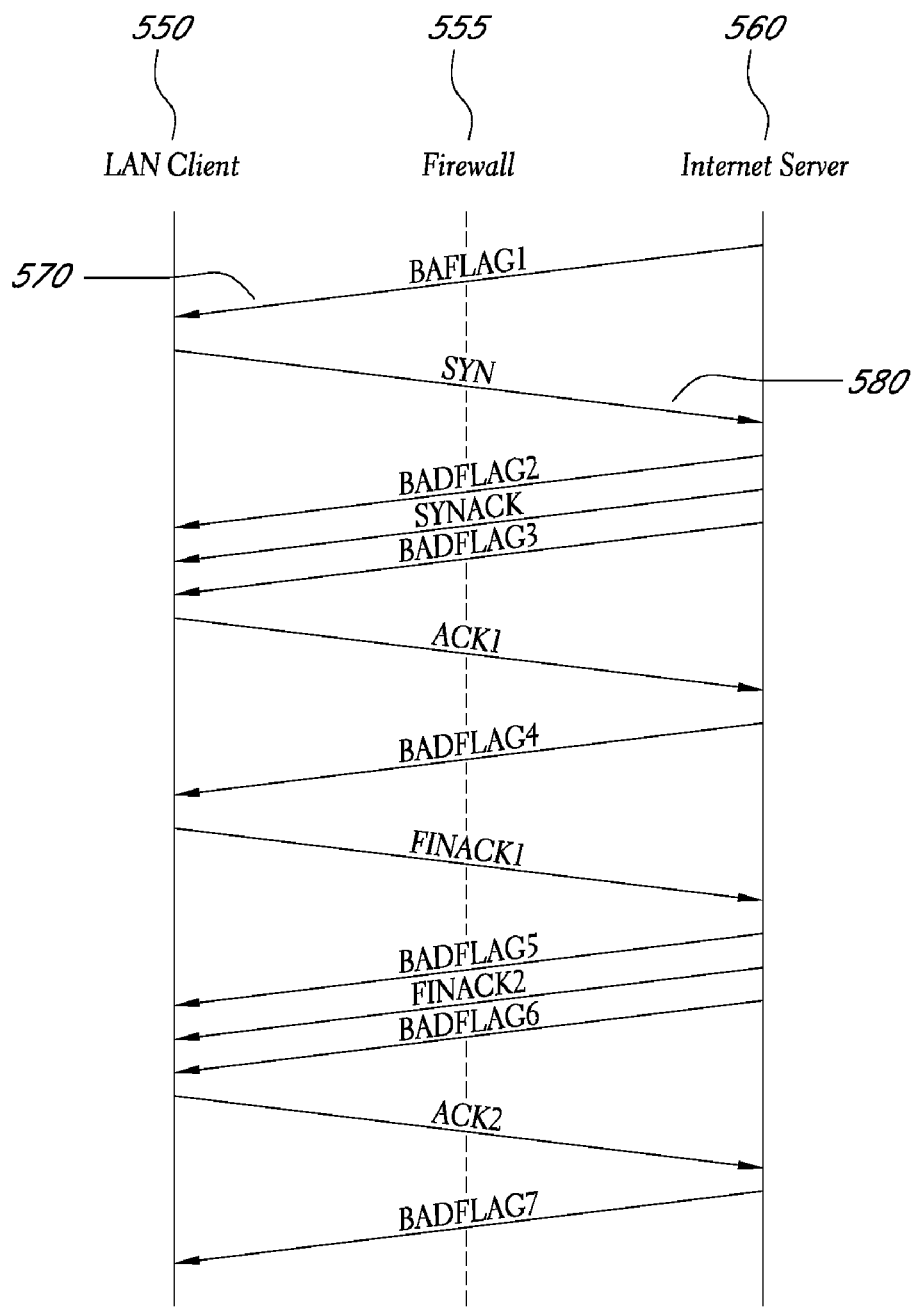
FIG. 5B illustrates a signal diagram for a transmission control protocol session that is derived from the grammar of FIG. 5A, according to an embodiment of the disclosure.

FIG. 5B illustrates a signal diagram for a transmission control protocol session that is derived from the grammar of FIG. 5A, according to an embodiment of the disclosure. As shown, the test case can be used to check for faults of a system under test 130, such as a firewall 555 in a local area network (LAN). When an inbound packet 570 that is destined for a LAN client 550, such as a computer, is received by the firewall 555 from an internet server 560 it may be inspected for illegal flag combinations, such as bad flags.

In one embodiment, a fault of the firewall 555 may be revealed when the inbound packet is forwarded on to LAN client 550 on the other side of the firewall. In some embodiments, a fault can also be revealed when an outbound packet 580 that includes a bad flag (not shown) is forwarded on from LAN client 550 to internet server 560 by firewall 555 instead of being dropped. It is worth noting that other test cases may be derived from the grammar of FIG. 5A, which may reveal faults of firewall 555.

All of the methods and processes described above can be embodied in, and fully automated via, software code modules executed by one or more general purpose computers. The code modules can be stored in any type of computer-readable medium or other computer storage device. Some or all of the methods can alternatively be embodied in specialized computer hardware.

Although this invention has been described in terms of certain embodiments and applications, other embodiments and applications that are apparent to those of ordinary skill in the art, including embodiments which do not provide all of the features and advantages set forth herein, are also within the scope of this invention. According, the scope of the present invention is intended to be defined only by reference to the following claims.

What is claimed is:

1. A system for automating testing of control devices, the system comprising:
    a computer memory that stores a grammar comprising one or more terminal and nonterminal symbols with tags that describe a first set of test cases; and
    a processor that is operable to:
        generates the first set of test cases for a device under test using the grammar;
        receives feedback about the execution of the first set of test cases from the device under test;
        in response to the feedback, automatically modify the grammar to identify at least one cause of failure of the device under test as a function of the received feedback; and
        generate a second set of test cases for the device under test using the grammar.

2. The system of claim 1, wherein the processor is further operable to modify tags of the grammar.

3. The system of claim 1, wherein the processor is further operable to insert new tags into the grammar.

4. The system of claim 1, wherein the processor is further operable to modify the grammar to isolate a cause of failure for the device under test.

5. The system of claim 1, wherein the device under test comprises a programmable logic controller.

6. The system of claim 1, wherein the processor modifies the grammar to reveal at least one cause of failure for the device under test.

7. The system of claim 1, wherein the feedback identifies a fault in the device under test.

8. The system of claim 7, wherein the processor is further operable to modify the grammar to identify a cause of or isolate the identified fault.

9. The system of claim 7, wherein the processor is further operable to modify the grammar to remove at least one test case not associated with the identified fault.

10. The system of claim 1, wherein the processor is further operable to generate a set of test cases using a grammar based on a generator configuration file.

11. The system of claim 10, wherein the generator configuration file corresponds to at least one of a configuration option and a parameter for generating a set of test cases.

12. The system of claim 11, wherein the processor automatically modifies the generator configuration file in response to the feedback.

13. A computer-implemented method of automatically generating tests using a grammar, the method comprising:
    tagging a first grammar with a first set of tags;
    creating a first set of test cases from the first grammar;
    applying the first set of test cases to a system under test;
    receiving output from the system under test;
    based on the output, automatically creating a second grammar to identify at least one cause of failure of the system under test based; and
    creating a second set of test cases from the second grammar.

14. The method of claim 13, wherein the second grammar is created by modifying the first set of tags of the first grammar.

15. The method of claim 13, wherein the second grammar is created by adding a second set of tags to the first grammar.

16. The method of claim 13, further comprising applying the second set of test cases to the system under test.

17. The method of claim 13, wherein the system under test comprises a hardware device.

18. The method of claim 13, wherein the system under test comprises a software application.

19. The method of claim 13, wherein the set of test cases simulates network attacks on the system under test.

20. The method of claim 13, wherein automatically creating a second grammar includes automatically creating a second grammar to isolate a cause of failure for the device under test.

21. The method of claim 13, wherein automatically creating a second grammar includes automatically creating a second grammar to reveal a cause of failure for the device under test.

22. The method of claim 13, wherein the results identify a fault in the device under test.

23. The method of claim 22, wherein automatically creating a second grammar includes automatically creating a second grammar to identify a cause of or isolate the identified fault.

24. A computer-implemented method of searching for fault revealing tests, the method comprising:
    generating a first set of test cases from a grammar with tags for a system under test;
    receiving results of the first set of test cases being applied to the system under test;
    modifying the tags of the grammar in response to the results of the first set of test cases to isolate or reveal causes of failure of the system under test based on the received results; and
    generating a second set of test cases from the grammar with tags for the system under test.

25. The method of claim 24, wherein the system under test comprises a distributed control system.

26. The method of claim 24, wherein the system under test comprises a supervisory control and data acquisition system.

27. The method of claim 24, wherein modifying the tags of the grammar includes modifying the tags of the grammar to isolate a cause of failure for the device under test.

28. The method of claim 24, wherein the modifying the tags of the grammar includes modifying the tags of the grammar to reveal a cause of failure for the device under test.

29. A computer readable medium having stored thereon computer executable components, the medium comprising:
    a grammar framework that includes an original grammar with one or more tags that describes a set of one or more tests and generates the set of one or more tests from the original grammar; and
    a grammar processing engine that receives results from the set of tests being executed on a system under test and, based on the results, automatically creates a new grammar with tags that describe tests that reveal faults of the system under test.

30. The computer readable medium of claim 29, wherein the tests generated from the new grammar are smaller than the tests generated from the original grammar and reveal similar faults.

31. The computer readable medium of claim 29, wherein the tests generated from the new grammar isolate a cause of failure for the system under test.

32. The computer readable medium of claim 29, wherein the tests generated from the original grammar determine whether the system under test is connected to a network.

33. The computer readable medium of claim 29, wherein the grammar processing engine automatically creates a new grammar with tags that describe tests that isolate faults of the system under test.

* * * * *